(12) United States Patent
Brooks et al.

(10) Patent No.: US 10,973,166 B2
(45) Date of Patent: Apr. 13, 2021

(54) AUTOMATIC DRIVELINE CALIBRATION FOR AN AGRICULTURAL MACHINE

(71) Applicant: CNH Industrial America LLC, New Holland, PA (US)

(72) Inventors: Nathan Brooks, Manitowoc, WI (US); Steven Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 265 days.

(21) Appl. No.: 16/257,439

(22) Filed: Jan. 25, 2019

(65) Prior Publication Data

US 2020/0236844 A1 Jul. 30, 2020

(51) Int. Cl.
| | |
|---|---|
| *A01C 23/04* | (2006.01) |
| *A01C 23/00* | (2006.01) |
| *E02F 9/26* | (2006.01) |
| *E02F 9/20* | (2006.01) |

(52) U.S. Cl.
CPC .......... *A01C 23/047* (2013.01); *A01C 23/007* (2013.01); *E02F 9/2041* (2013.01); *E02F 9/265* (2013.01)

(58) Field of Classification Search
CPC ... A01C 23/047; A01C 23/007; E02F 9/2041; E02F 9/265
USPC .......................................................... 701/50
See application file for complete search history.

(56) References Cited

U.S. PATENT DOCUMENTS

| | | | |
|---|---|---|---|
| 5,787,374 A | 7/1998 | Ferguson et al. | |
| 7,225,060 B2 | 5/2007 | O'Connor et al. | |
| 7,277,785 B2 | 10/2007 | Strosser et al. | |
| 7,398,144 B2 | 7/2008 | Strosser et al. | |
| 7,483,780 B2 | 1/2009 | Strosser et al. | |
| 7,516,244 B2 | 4/2009 | Kelly et al. | |
| 7,706,926 B2 | 4/2010 | Peterson | |
| 7,778,756 B2 | 8/2010 | Hartwick et al. | |
| 8,116,977 B2 | 2/2012 | Aral et al. | |
| 8,386,397 B1 | 2/2013 | Foster et al. | |
| 9,234,329 B2 | 1/2016 | Jallwala | |

(Continued)

OTHER PUBLICATIONS

Henderson, Lynn; "Show Stopping Introduction"; trade journal; Jul./Aug. 2017; 4 pages; vol. 55, Issue 6; Henderson Communications LLC; St. Louis, US.

(Continued)

*Primary Examiner* — Gertrude Arthur Jeanglaude
(74) *Attorney, Agent, or Firm* — Rebecca L. Henkel; Rickard K. DeMille

(57) ABSTRACT

By using various feedback data on a sprayer system, such as engine speed, wheel speed, sensed temperatures and/or sensed pressures, an onboard logic controller can be used to fine tune parameters of the driveline system in an automatic calibration process. In one aspect, a controller can drive up engine speed and manipulate electrical current being sent to coils of propel pumps and/or wheel motors as current reaches a point where there is no more change in wheel speed as detected by the system, thereby achieving a calibration setpoint. Additionally, during the automatic calibration process, the machine as a whole can be monitored with respect to several sensors, such as pressures, temperatures, and the like, so that if any parameter being monitored is out of a predetermined range, the calibration can be stopped and not set.

20 Claims, 7 Drawing Sheets

(56) References Cited

U.S. PATENT DOCUMENTS

| | | | |
|---|---|---|---|
| 9,320,192 B2 | 4/2016 | Steffen | |
| 9,832,926 B2 | 12/2017 | Muench | |
| 9,964,648 B2 | 5/2018 | Guyette et al. | |
| 10,677,354 B2* | 6/2020 | Bauer | F16H 61/4096 |
| 2016/0175869 A1 | 6/2016 | Sullivan | |
| 2016/0318465 A1 | 11/2016 | Brooks | |
| 2017/0113691 A1* | 4/2017 | Meehan | B66F 9/22 |

OTHER PUBLICATIONS

Hill. Peter; "Lamma 2016 Preview: The Show Reel"; trade journal; Jan. 8, 2016; 15 pages; vol. 164, Issue 22; Reed Business Information UK; Sutton, UK.

Brooks, Rhonda; "4 Easy Ways to Use Precision Technology"; magazine/journal; Oct. 15, 2018; 2 pages; vol. 142, Issue 11; Farm Journal Media.

* cited by examiner

AUTOMATIC DRIVELINE CALIBRATION FOR AN AGRICULTURAL MACHINE

FIELD OF THE INVENTION

The invention relates generally to agricultural product application equipment, such as self-propelled sprayers and, in particular, to a self-propelled off-road agricultural vehicle configured to receive an input from a user operable to automatically calibrate a hydrostatic drivetrain system so that a magnitude of an electrical signal for controlling a minimum or a maximum amount of hydraulic power that is usable by the hydrostatic drivetrain system is determined.

BACKGROUND OF THE INVENTION

Agricultural machines, such as self-propelled sprayers, are getting larger to increase operating efficiency, such as by covering more area in a single pass of a spraying session. The larger machines are also getting heavier. Hydraulic drive systems have been effectively used to power and steer the wheels of these larger machines, which allows for increased ground clearance because of the absence of mechanical driveline components for the hydraulic drive systems.

Modern agricultural machines may be complex with a variety of systems and devices, such as for steering, throttle control, engine control and the like. Such electronically controlled devices are typically calibrated and configured at the factory. However, over time, excessive wear on particular components may cause such systems and devices to lose some amount of responsiveness.

As a result, service personnel are typically required to interface with the electronically controlled devices, such as via an ISO bus or CAN bus, to perform diagnostics, troubleshoot components and/or re-calibrate aspects of the system. However, this may be time consuming, troublesome and expensive for the operator and service personnel.

Also, in some systems, a user may interact with an onboard computer to re-calibrate aspects of the system. However, this typically requires the user to observe certain characteristics of the machine, such as wheel speed or turn, and select an input marking such characteristic when it occurs. This can be labor intensive and sometimes lead to inaccurate results caused by human error.

SUMMARY OF THE INVENTION

By using various feedback data on a sprayer system, such as engine speed (measured in revolutions per minute (RPM)), wheel speed (measured in RPM), sensed temperatures and/or sensed pressures, an onboard logic controller can be used to fine tune parameters of the driveline system in an automatic calibration process. In one aspect, a controller can drive up engine speed and manipulate electrical current being sent to coils of propel pumps and/or wheel motors as current reaches a point where there is no more change in wheel speed as detected by the system, thereby achieving a calibration setpoint. Additionally, during the automatic calibration process, the machine as a whole can be monitored with respect to several sensors, such as pressures, temperatures, and the like, so that if any parameter being monitored is out of a predetermined range, the calibration can be stopped and not set.

Specifically, then, one aspect of the invention can include an agricultural machine, including: a chassis supporting a cab and having multiple wheels; a hydrostatic drivetrain system for delivering power to the wheels and including: an internal combustion engine supported by the chassis, a hydrostatic pump system receiving torque from the internal combustion engine and converting the torque from the internal combustion engine into hydraulic power for use by the hydrostatic drivetrain system, and hydraulic motors receiving hydraulic power from the hydrostatic pump system and arranged for delivering power for rotating the wheels, each hydraulic motor being configured to receive hydraulic fluid from the hydrostatic pump system for driving rotation of a wheel and return hydraulic fluid to the hydrostatic pump system; and a processor executing a program stored in a non-transient medium, the processor executing the program to: receive an input from a user operable to automatically calibrate the hydrostatic drivetrain system so that a magnitude of an electrical signal for controlling a minimum or a maximum amount of hydraulic power that is usable by the hydrostatic drivetrain system is determined.

Another aspect of the invention can include: a self-propelled agricultural vehicle, including: a chassis supporting a cab and having multiple wheels for moving the vehicle; an application system supported by the chassis and including at least one storage container storing a volume of product for delivery onto an agricultural field; a hydrostatic drivetrain system for delivering power to the wheels and including: an internal combustion engine supported by the chassis, a hydrostatic pump system receiving torque from the internal combustion engine and converting the torque from the internal combustion engine into hydraulic power for use by the hydrostatic drivetrain system, the hydrostatic pump system including first and second pumps arranged as a tandem pair of variable displacement hydrostatic pumps, and hydraulic motors receiving hydraulic power from the hydrostatic pump system and arranged for delivering power for rotating the wheels, each hydraulic motor being configured to receive hydraulic fluid from the hydrostatic pump system for driving rotation of a wheel and return hydraulic fluid to the hydrostatic pump system; operator controls provided in the cab, the operator controls including a touchscreen Human Machine Interface (HMI); and a processor executing a program stored in a non-transient medium, the processor executing the program to: receive an input from a user operable to automatically calibrate the hydrostatic drivetrain system so that a magnitude of a first electrical signal for controlling a minimum or a maximum amount of hydraulic power from the first pump that is usable by the hydrostatic drivetrain system and a magnitude of a second electrical signal for controlling a minimum or a maximum amount of hydraulic power from the second pump that is usable by the hydrostatic drivetrain system are each determined.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
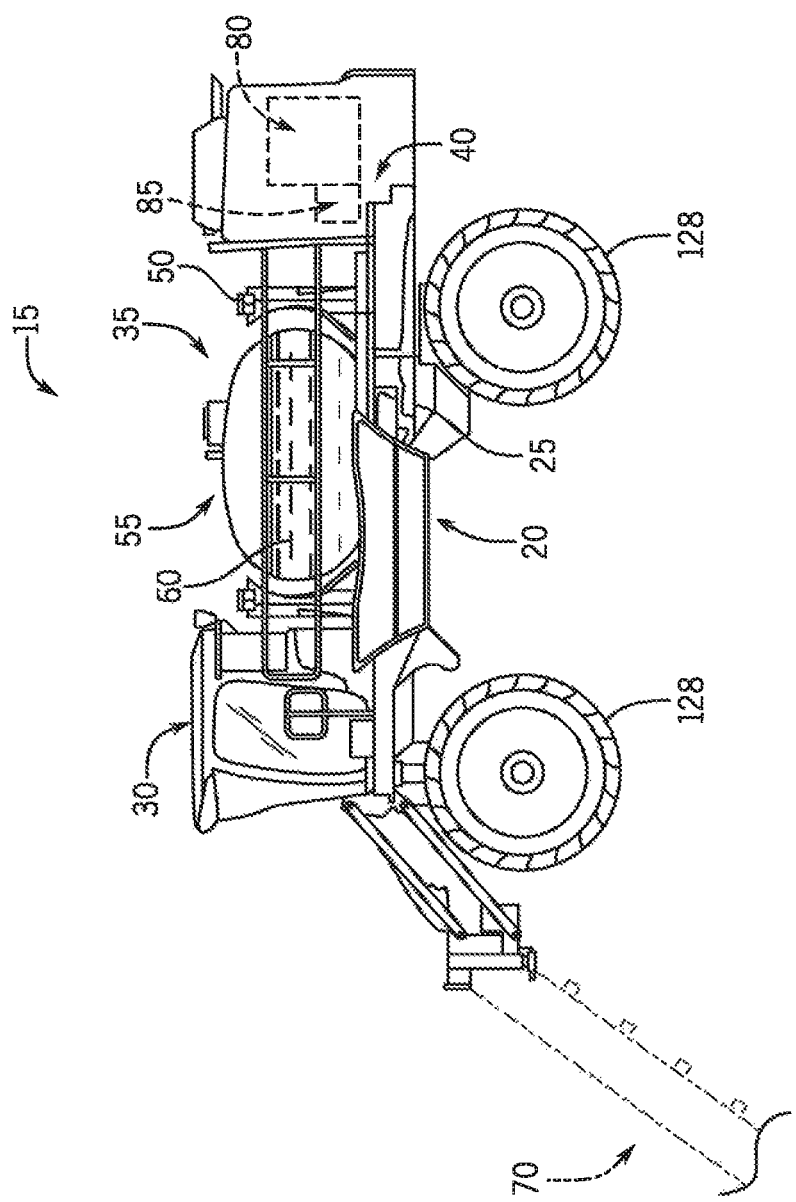
FIG. 1 is a side elevation view of self-propelled off-road agricultural vehicle with a system for automatically implementing calibrations according to the present invention.

Referring now to the drawings and specifically to FIG. 1, a system for receiving an input from a user operable to automatically calibrate a hydrostatic drivetrain system is provided, explained in greater detail elsewhere herein, and is shown for use with an exemplar self-propelled off-road agricultural vehicle. The self-propelled off-road agricultural vehicle may be an agricultural applicator that deposits, for example, liquid, as well as dry and gaseous product, above and below ground, pre-emerge and post-emergence or sprouting of the crop, which includes operations such as seeding, inter-seeding, fertilizing and application of, for example, herbicides, fungicides, and insecticides as well as soil conditioners, growth retardants, and other agents, such as by way of various toolbar attachments, planters, anhydrous ammonia applicators, and others. The self-propelled off-road agricultural vehicle as agricultural applicator may be a sprayer and is shown here by way of example as a self-propelled sprayer 15. The sprayer 15 is shown as a front-mounted boom self-propelled sprayer such as those available from CNH Industrial, including the Miller Nitro and the New Holland Guardian Series front-mounted boom sprayers. Although the sprayer 15 is shown as a front-mounted boom self-propelled sprayer, it is understood that self-propelled versions of the sprayer 15 can have either front-mounted, mid-mount, or rear-mounted booms, as well boom-less sprayers, tiered booms, and detachable sprayers.

Still referring to FIG. 1, sprayer 15 includes chassis 20 having chassis frame 25 that supports various assemblies, systems, and components. These various assemblies, systems, and components include a cab 30, and an application system shown as spray system 35, and a hydrostatic drivetrain system 40. Spray system 35 includes storage containers such as rinse tank 50 storing water or a rinsing solution and product tank 55 that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height-adjustable boom of a boom system 70 for release out of spray nozzles that are spaced from each other along the width of the boom during spraying operations of sprayer 15.

Figure 2:
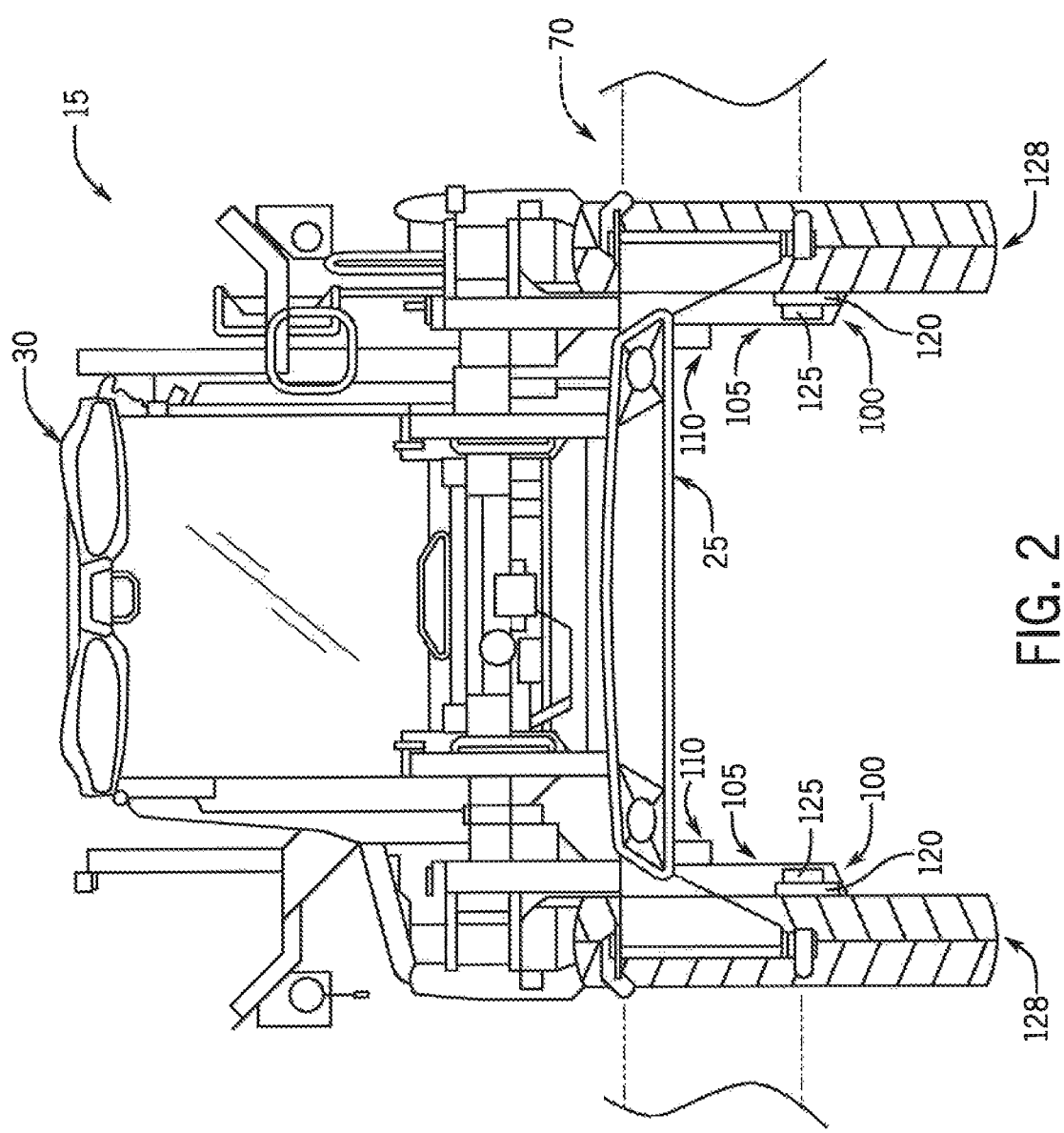
FIG. 2 is a front elevation view of the self-propelled off-road agricultural vehicle of FIG. 1.
Figure 3:
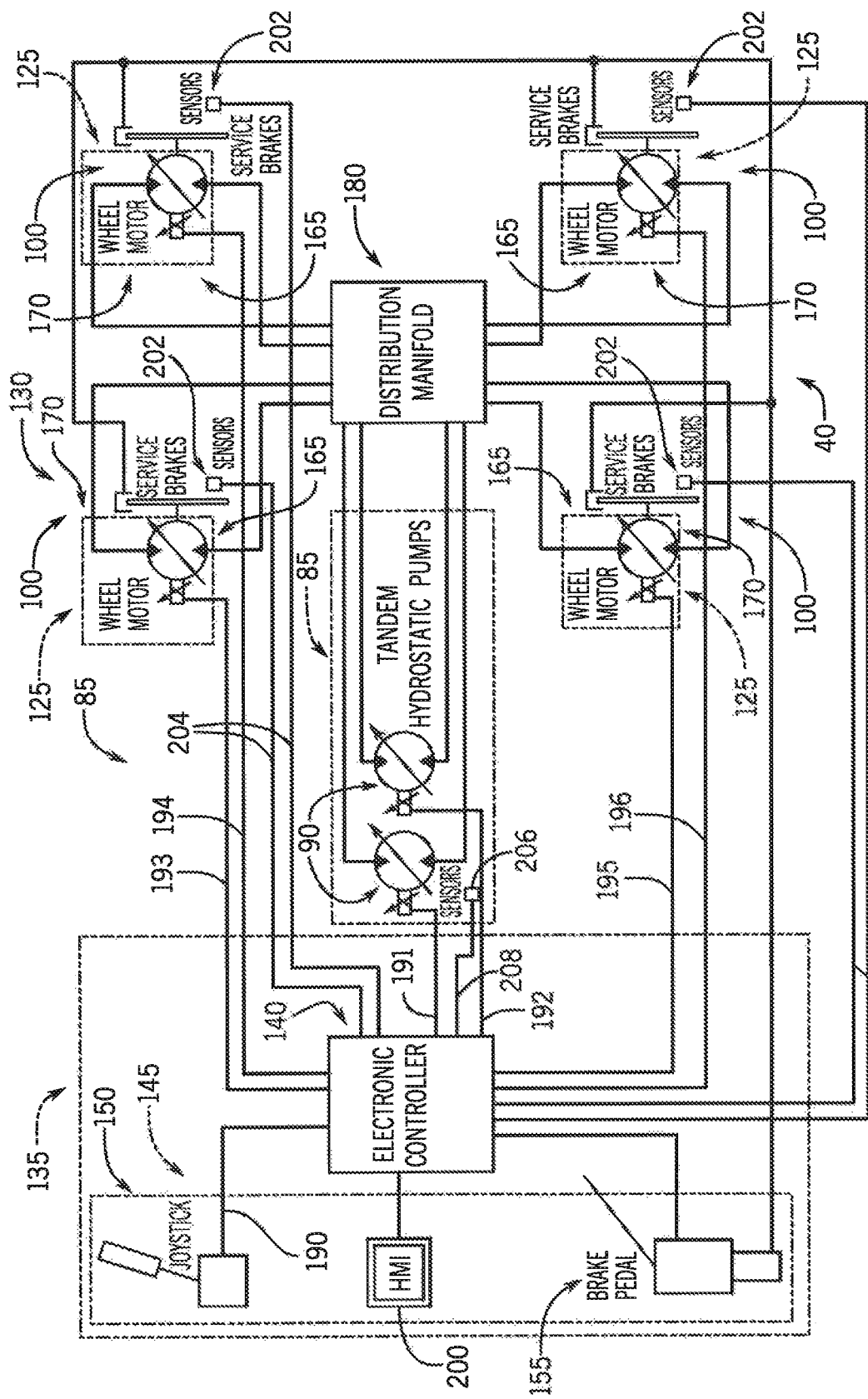
FIG. 3 is a simplified schematic representation of a circuit illustrating various systems according to the present invention.

Still referring to FIG. 1, the hydrostatic drivetrain system 40 includes an engine 80 and hydrostatic pump system 85 that receives power from the engine 80. FIG. 3 shows the hydrostatic pump system 85 as having a tandem pair of variable displacement hydrostatic pumps 90. Referring now to FIG. 2, wheel drives 100 are supported at bottom ends of legs 105 that extend from swing anus 110 that are pivot mounted to the chassis frame 25. Each wheel drive 100 may include a planetary gear set 120 and a hydraulic motor as a wheel motor 125 which may be a variable displacement wheel motor (see also FIG. 3) that directly drives the planetary gear set 120 to establish a direct drive relationship between each wheel drive 100 and its respective wheel 128 of the sprayer 15.

Referring now to FIG. 3, a propel circuit 130 is shown that includes the hydrostatic pump system 85, wheel motors 125, and control system 135 that controls the propel circuit 130. The control system 135 includes at least one electronic controller 140 that is configured to control operations of the hydrostatic drivetrain system 40. The electronic controller 140 may include a microprocessor, microcontroller or other logic, such as a Programmable Logic Controller (PLC) or industrial computer, along with corresponding software arid suitable memory for storing such software and hardware including interconnecting conductors for power and signal transmission and communication for controlling electronic, electromechanical, and hydraulic components of the hydrostatic drivetrain system 40. Communication may be accomplished through direct interconnection such as directly routed wiring harnesses or through one or more serial bus systems such as a CAN (Controller Area Network) bus(es) between the electronic controller 140 and the sensors, actuators, and/or other components of the sprayer 15 for monitoring and controlling corresponding systems and components of the hydrostatic drivetrain system 40, such as to control direction, speed and braking of the sprayer 15.

Still referring to FIG. 3, the control system 135 includes operator controls 145, which provide a user interface(s) allowing an operator to control hydrostatic drivetrain system 40 and other components of the sprayer 15. The operator controls 145 include a joystick 150 that has a grip with buttons for controlling various corresponding functions of the sprayer 15 including controlling operations of the boom system 70, such as boom height and tilt and spray delivery patterns, as well as controlling movement characteristics of the sprayer 15 such as range and speed controls. Moving the joystick 150 forward and/or backward with respect to a neutral gate may control direction and speed of travel of the sprayer 15. The operator controls 145 also include a brake pedal 155 with an integrated brake valve delivering pressurized hydraulic fluid upon depressing the brake pedal 155 to engage service brakes 160 at each wheel drive 100 to slow rotation of the respective wheel motor 125. Depressing the brake pedal 155 may also send a corresponding signal to the electronic controller 140, which sends a signal to the hydrostatic pump system 85 as a deceleration command to the pumps 90 for slowing the sprayer 15.

To propel the sprayer 15, the user can use the joystick 150 in communication with the electronic controller 140 via an electrical signal 190. The electronic controller 140, in turn, communicates with the tandem pair of variable displacement hydrostatic pumps 90. In particular, the electronic controller 140 can send a first electrical signal 191 to a coil of a first pump of the pumps 90, and a second electrical signal 192 to a coil of a second pump of the pumps 90. The electrical signals 191, 192 can control the coils in proportion to the speed commanded by the user through the joystick 150. The coils can control displacement of hydraulic fluid in the hydrostatic pump system 85. In one aspect, the first pump of the pumps 90 could be a front pump arranged forward of the sprayer 15, and the second pump of the pumps 90 could be a rear pump arranged rearward of the sprayer 15. A distribution manifold 180 may operably interconnect the pumps 90 of the hydrostatic pump system 85 to each of the wheel motors 125. Illustration of corresponding fluid reservoirs, accumulators and the like are omitted for clarity. Each wheel motor 125 has an inlet side 165 receiving hydraulic fluid and an outlet side 170 returning hydraulic fluid toward the hydrostatic pump system 85. Since wheel motors 125 can bi-directionally rotate, the inlet and outlet sides 165 and 170, respectively, may be opposite depending on which direction the wheel motors 125 are rotating. In addition, the electronic controller 140 can send wheel electrical signals 193, 194, 195 and 196 to coils of the wheel motors 125. The wheel electrical signals 193, 194, 195 and 196 can control the coils in proportion to the speed commanded by the user through the joystick 150. Accordingly, the aforementioned coils which may receive electrical currents for electromagnetically actuating swashplates to tilt at varying angles for producing varying pressure flows within the system. The minimum amount of current (minimum value) required for initially actuating each pump and/or motor (such as the current required to initially tilt the swashplate) may be calibrated at each point in the system. Similarly, the maximum amount of current (maximum value) required for fully actuating each pump and/or motor (such as the least amount of current required to completely tilt the swashplate) may be calibrated at each point in the system.

Still referring to FIG. 3, a touchscreen Human Machine Interface (HMI) 200, in the cab 30, is provided for receiving inputs from a user of the sprayer 15. In particular, the HMI 200 can receive an input operable to automatically calibrate the hydrostatic drivetrain system 40 so that a magnitude of one or more of the aforementioned electrical signals for controlling the hydrostatic drivetrain system 40 can be precisely determined. Accordingly, the HMI 200 can implement automatic on-screen calibration of the driveline system of the sprayer 15, including the propel pumps 90 and/or wheel motors 125. The HMI 200 includes a touchscreen allowing high resolution color graphic display with the capability of receiving touch commands on the screen from an operator or user. The HMI 200 may connect to a machine controller, such as the electronic controller 140, for example, such as via an Society of Automotive Engineers (SAE) J1939 bus, International Organization for Standardization (ISO) 11783 (ISOBUS), ISO 11898 bus and/or other Controller Area Network (CAN) bus. Accordingly, the HMI 200, via the electronic controller 140, may communicate and interact with various systems and electronically controlled devices of the sprayer 15 to effect calibrations, including the hydrostatic pump system 85 and the wheel motors 125.

Figure 4:
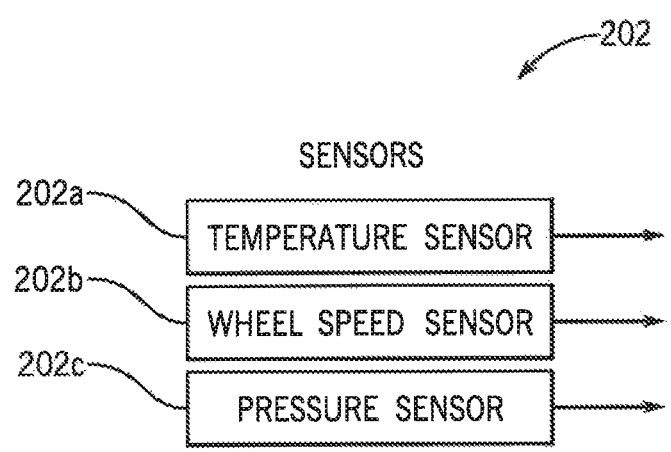
FIG. 4 is a detailed view of a sensor array in the schematic of FIG. 3.

To achieve automatic calibration with minimal user input, a sensor array 202 can be arranged with respect to each wheel motor 125. The sensor array 202 can continuously send variously sensed measurements to the electronic controller 140 via electrical signals 204. With additional reference to FIG. 4, in one aspect, the sensor array 202 could include a temperatures sensor 202a, a wheel speed sensor 202b and/or a pressure sensor 202c, among other sensors. The temperatures sensor 202a could comprise, for example, a thermocouple arranged proximal to the wheel motor 125 for determining a temperature of the motor and/or hydraulic fluid running through the motor. The wheel speed sensor 202b could comprise, for example, a Hall effect sensor arranged with respect to wheel motor 125 for individually determining wheel speed measured in revolutions per minute (RPM). The pressure sensor 202c could comprise, for example, a transducer sensor arranged with respect to wheel motor 125 for determining a pressure of the hydraulic fluid.

Similarly, a sensor array 206 can be arranged with respect to the hydrostatic pump system 85. The sensor array 206 can also send variously sensed measurements to the electronic controller 140 via electrical signals 208. In one aspect, the sensor array 202 could include one or more temperature sensors and/or pressure sensors arranged proximal to the pumps 90, among other sensors.

Figure 5:
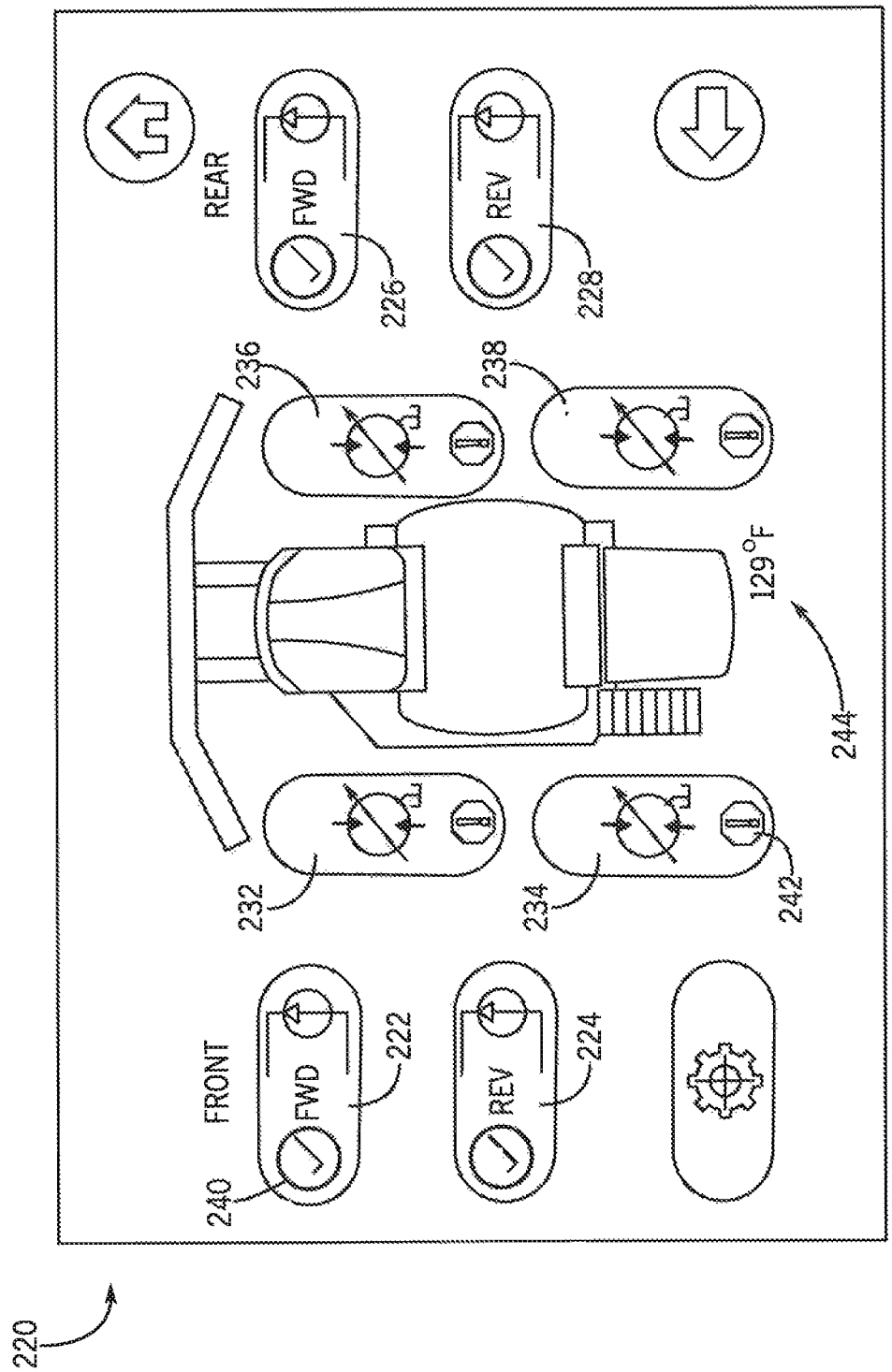
FIG. 5 is an exemplar view provided to a Human Machine Interface (HMI) for automatically calibrating the driveline of the self-propelled off-road agricultural vehicle of FIG. 1.

Referring now to FIG. 5, an exemplar calibration screen 220 may be provided to the HMI 200 for automatically calibrating the driveline system of the sprayer 15, including the propel pumps 90 and/or wheel motors 125. A user can make a selection on the HMI 200 to view the calibration screen 220. The calibration screen 220 can include various icons associated with the driveline system, including the propel pumps and/or wheel motors, for automatically achieving calibration thereof. The system can receive an input from the user, through the calibration screen 220, to initiate such automatic calibrations. For individually calibrating the propel pumps 90, the various icons can include, for example: a "Front Forward" icon 222, for calibrating the first (front) pump of the pumps 90 in the forward direction; a "Front Reverse" icon 224, for calibrating the first (front) pump in the reverse direction; a "Rear Forward" icon 226, for calibrating the second (rear) pump of the pumps 90 in the forward direction; and/or a "Rear Reverse" icon 228, for calibrating the second (rear) pump in the reverse direction. Also, for individually calibrating the wheel motors 125, the various icons can include, for example: a Front Left Wheel Motor icon 232, for calibrating the front left wheel motor 125; a Rear Left Wheel Motor icon 234, for calibrating the rear left wheel motor 125; a Front Right Wheel Motor icon 236, for calibrating the front right wheel motor 125; and/or a Rear Right Wheel Motor icon 238, for calibrating the rear right wheel motor 125. A user touching a respective icon is sufficient to automatically calibrate such aspect so long as other requirements are met, including sensed operation in a valid temperature range, as described herein. A completion mark 240, such as a check mark, can be displayed with respect to each icon which has completed calibration, whereas a warning mark 242, such as an exclamation mark, can be displayed with respect to each icon which has not completed calibration. To ensure sensed operation is in a valid temperature range, the HMI 200 can further display on the calibration screen 220 a current temperature 244 as sensed by the sensor array 202 and/or the sensor array 206, depending on the particular aspect selected for calibration.

Figure 6:
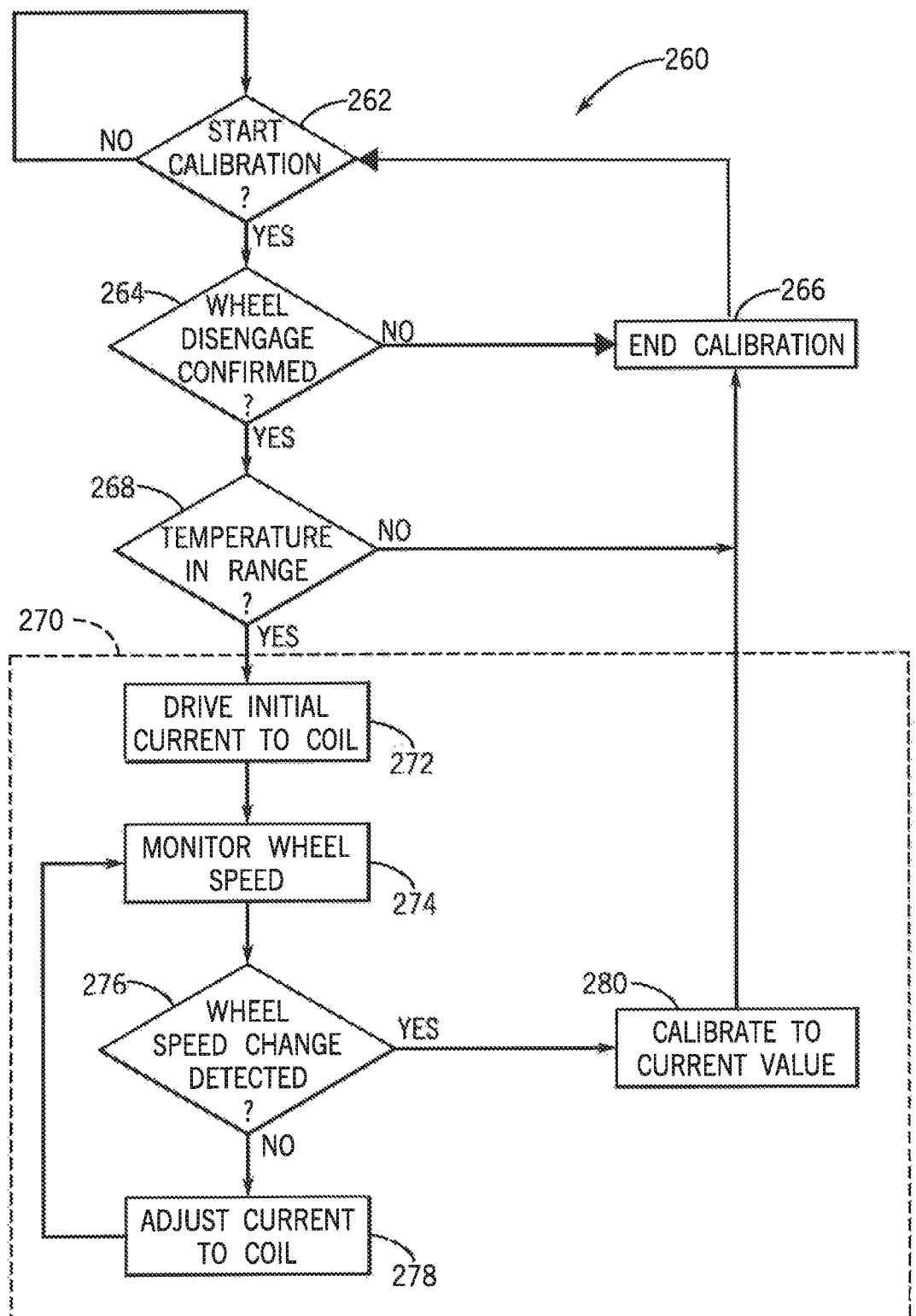
FIG. 6 is flow chart for automatically calibrating the driveline of the self-propelled off-road agricultural vehicle of FIG. 1.

With additional reference to FIG. 6, a process 260 for automatically calibrating the driveline of the sprayer 15, implemented by a processor executing a program stored in a non-transient medium, is provided in accordance with an aspect of the invention. Beginning at decision step 262, the processor can execute to determine whether a selection for automatically calibrating an aspect of the system has been received. If a selection has not been received ("No"), the process 260 goes no further. However, if a selection has been received to automatically calibrate an aspect the hydrostatic drivetrain system 40 ("Yes"), such as receiving an input from the user to automatically calibrate the first (front) pump of the pumps 90 in the forward direction, or to automatically calibrate the front left wheel motor 125, the process 260 can continue to step 264.

At step 264, the system confirms that the sprayer 15 is in a ready condition for the particular calibration. A ready condition could comprise, for example, disengagement of a particular planetary gear set 120. If the sprayer 15 is not in a ready condition ("No"), the process can end calibration at step 266 and return to the beginning at step 262 to await a calibration command, perhaps of another aspect of the system. However, if the sprayer 15 is in a ready condition ("Yes"), the process can continue to step 268.

At step 268, the system can determine if the current temperature as sensed by the sensor array 202 and/or the sensor array 206, depending on the particular aspect selected for calibration, is in a valid temperature range. This can ensure that the system is warm enough to obtain an accurate calibration. In one aspect, the system can enforce a predetermined minimum temperature value, such as at least 100 degrees Fahrenheit, of particular aspect selected for calibration in order to allow calibration to continue. Also, enforcing the valid temperature range can ensure that the current temperature is below a predetermined maximum value, so that the system is not too hot for potentially stressful calibration activity, such as running maximum wheel speeds and/or engine speeds, to prevent damage. If the system is not in the valid temperature range ("No"), the process can end calibration at step 266 and return to the beginning at step 262 to await a calibration command, perhaps of another aspect of the system. However, if the system is in the valid temperature range ("Yes"), the process can continue to calibration block 270.

Figure 7:
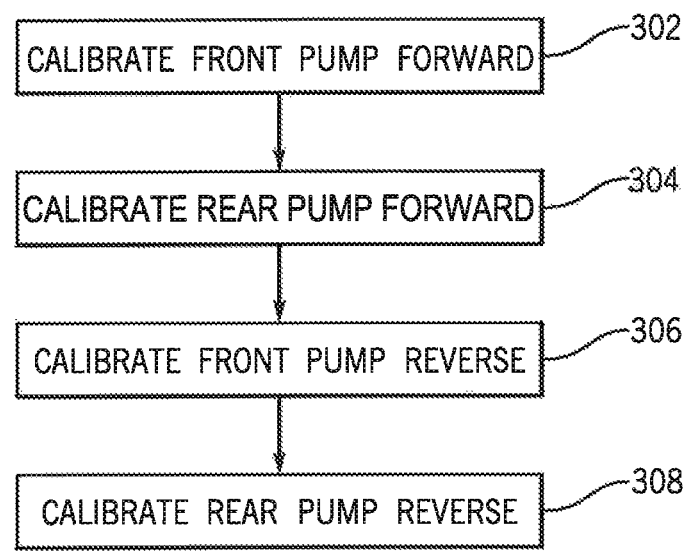
FIG. 7 is flow chart for automatically calibrating propel pumps of the driveline according to the present invention.
Figure 8:
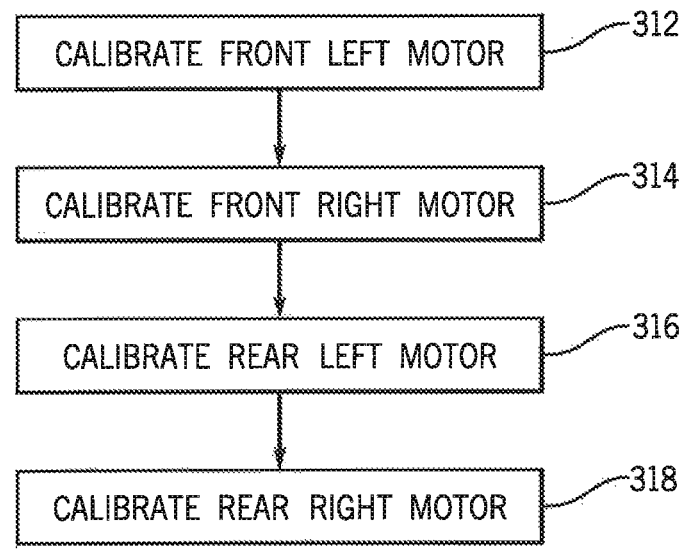
FIG. 8 is flow chart for automatically calibrating wheel motors of the driveline according to the present invention.

Calibration block 270 can be carried out with respect to various aspects of the propel pumps 90 and/or wheel motors 125 as selected by the user through the calibration screen 220. For example, with additional reference to FIG. 7, for the propel pumps 90, the calibration block 270 could comprise one or more of calibrating the front pump forward (front pump turning a given wheel motor in the forward direction) at block 302, calibrating the rear pump forward (rear pump turning the given wheel motor in the forward direction) at block 304, calibrating the front pump reverse (front pump turning the given wheel motor in the reverse direction) at block 306 and/or calibrating the rear pump reverse (rear pump turning the given wheel motor in the reverse direction) at block 308. Also, with additional reference to FIG. 8, for the wheel motors 125, the calibration block 270 could comprise one or more of calibrating the front left motor at block 312, calibrating the front right motor at block 314, calibrating rear left motor at block 316 and/or calibrating rear right motor at block 318.

Referring again to FIG. 6, the calibration block 270 could comprise, for example, at step 272, driving a voltage or current at an initial magnitude to a particular coil via an electrical signal. Then, at step 274, a particular wheel speed of a wheel motor 125 relevant to the calibration can be monitored, as measured by a wheel speed sensor 202b. At decision step 276, if no change in a wheel speed is detected ("No"), the process can continue to step 278 to adjust the magnitude of the electrical signal. Then, the process can return to step 274, further monitoring the wheel speed, and decision step 276. If at decision step 276 a change in a wheel speed is detected ("Yes"), the process can continue to step 280 to calibrate the electrical signal to the current magnitude. Then, the calibration block 270 can end, returning to step 266 to end calibration, and step 262 to await another calibration command. Otherwise, the process can repeat in a loop, adjusting the magnitude, while monitoring the wheel speed, until a calibration value is determined.

The calibration block 270 can execute to calibrate minimum and/or maximum magnitudes of electrical signals for forward and/or reverse states of the front and/or rear pumps. For example, the calibration block 270 can execute to calibrate a minimum magnitude of the electrical signal 191 for the front pump forward at block 302. The minimum magnitude may comprise initially setting an electrical current of the electrical signal 191 to 0 milliamps, then incrementing, 1 milliamp at a time, until an initial wheel speed of a wheel motor 125 is sensed, such as the right rear wheel motor going from 0 to a non-zero RPM. The minimum magnitude could be, for example, 670 milliamps. Block 270 can similarly be executed for calibrating minimum values of electrical signals for the rear pump forward, the front pump reverse, and the rear pump reverse at blocks 304, 306 and 308 of FIG. 7, respectively. Also, for example, the calibration block 270 can execute to calibrate a maximum magnitude of the electrical signal 191 for the front pump forward at block 302. The maximum magnitude may comprise initially setting an electrical current of the electrical signal 191 to a maximum current, then decrementing, 1 milliamp at a time, until a change in wheel speed of a wheel motor 125 is sensed, such as the right rear wheel motor going from a maximum RPM to less than the maximum RPM. The maximum magnitude could be, for example, 1590 milliamps. Block 270 can similarly be executed for calibrating maximum values of electrical signals for the rear pump forward, the front pump reverse, and the rear pump reverse at blocks 304, 306 and 308 of FIG. 7, respectively. In addition, during such calibrations, multiple current magnitude versus wheel. RPM points can be gathered between 0 RPM and the maximum RPM to form a corresponding curve for executing precise control with respect to the hydrostatic pump system 85.

Also, the calibration block 270 can execute to calibrate minimum and/or maximum magnitudes of electrical signals for front/rear and/or left/right wheel motors. For example, the calibration block 270 can execute to calibrate a maximum magnitude of the electrical signal 193 for the front left wheel motor at block 312. The maximum magnitude may comprise initially setting an electrical current of the electrical signal 193 to a maximum magnitude to achieve a maximum RPM at the front left wheel, then decrementing, 1 milliamp at a time, until a change in wheel speed of the wheel motor 125 is sensed, such as the front left wheel going from a maximum RPM to less than the maximum RPM. The maximum magnitude could be, for example, 1750 milliamps. Block 270 can similarly be executed for calibrating maximum values of electrical signals for the front right motor, the rear left motor, and the rear right motor 314, 316 and 318 of FIG. 8, respectively. The calibration block 270 can similarly execute to calibrate minimum magnitudes of electrical signals for front/rear and/or left/right wheel motors. Accordingly, the system can automatically calibrate the hydrostatic drivetrain system 40 so that magnitudes of electrical signals for controlling minimums and/or maximums amount of hydraulic power that is usable by the hydrostatic drivetrain system 40 is determined.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:
1. An agricultural machine, comprising:
a chassis supporting a cab and having a plurality of wheels;
a hydrostatic drivetrain system for delivering power to the wheels and including:
an internal combustion engine supported by the chassis,
a hydrostatic pump system receiving torque from the internal combustion engine and converting the torque from the internal combustion engine into hydraulic power for use by the hydrostatic drivetrain system, and
hydraulic motors receiving hydraulic power from the hydrostatic pump system and arranged for delivering power for rotating the wheels, each hydraulic motor being configured to receive hydraulic fluid from the hydrostatic pump system for driving rotation of a wheel and return hydraulic fluid to the hydrostatic pump system; and
a processor executing a program stored in a non-transient medium, the processor executing the program to:
receive an input from a user operable to automatically calibrate the hydrostatic drivetrain system so that a magnitude of an electrical signal for controlling a minimum or a maximum amount of hydraulic power that is usable by the hydrostatic drivetrain system is determined.

2. The agricultural machine of claim 1, wherein the hydrostatic pump system comprises a tandem pair of variable displacement hydrostatic pumps with a front pump of the tandem pair arranged forward of the machine and a rear pump of the tandem pair arranged rearward of the machine.

3. The agricultural machine of claim 2, wherein the magnitude of the electrical signal is a first magnitude of a first electrical signal for controlling a minimum amount of hydraulic power from the front pump, and further comprising the processor executing to determine a second magnitude of the first electrical signal for controlling a maximum amount of hydraulic power from the front pump, a first magnitude of a second electrical signal for controlling a minimum amount of hydraulic power from the rear pump, and a second magnitude of the second electrical signal for controlling a maximum amount of hydraulic power from the rear pump.

4. The agricultural machine of claim 1, further comprising the processor executing to calibrate the hydrostatic drivetrain system so that a magnitude of a wheel signal for controlling a minimum or a maximum amount of power delivered to a wheel that is usable by the wheel is determined.

5. The agricultural machine of claim 4, wherein the magnitude of the wheel signal is a magnitude of a first wheel signal for controlling a maximum amount of power delivered to a first wheel of the plurality of wheels, and further comprising the processor executing to determine a magnitude of a second wheel signal for controlling a maximum amount of power delivered to a second wheel of the plurality of wheels, a magnitude of a third wheel signal for controlling a maximum amount of power delivered to a third wheel of the plurality of wheels and a magnitude of a fourth wheel signal for controlling a maximum amount of power delivered to a fourth wheel of the plurality of wheels.

6. The agricultural machine of claim I, further comprising a temperature sensor configured to sense a temperature of the hydraulic fluid, and further comprising the processor executing to calibrate the hydrostatic drivetrain system only when the temperature is above a predetermined minimum value.

7. The agricultural machine of claim 6, wherein the predetermined minimum value is at least 100 degrees Fahrenheit.

8. The agricultural machine of claim 6, further comprising the processor executing to calibrate the hydrostatic drivetrain system only when the temperature is between the predetermined minimum value and a predetermined maximum value.

9. The agricultural machine of claim 1, further comprising a Human Machine Interface (HMI) provided in the cab, wherein the HMI is operable to receive the input operable to calibrate the hydrostatic drivetrain system.

10. The agricultural machine of claim 1, wherein the processor determines the minimum amount of hydraulic power that is usable by the hydrostatic drivetrain system by continuously incrementing the magnitude of the electrical signal until an initial speed of a wheel of the plurality of wheels is detected.

11. The agricultural machine of claim 10, wherein the processor determines the maximum amount of hydraulic power that is usable by the hydrostatic drivetrain system by continuously incrementing the magnitude of the electrical signal until a change in speed of the wheel is no longer detected.

12. The agricultural machine of claim 11, further comprising a wheel speed sensor arranged with respect to the wheel, wherein the processor executes to continuously monitor the wheel speed sensor for the initial speed and the change.

13. The agricultural machine of claim 1, wherein the electrical signal controls a coil controlling displacement of hydraulic fluid in the hydrostatic pump system.

14. A self-propelled agricultural vehicle, comprising:
a chassis supporting a cab and having a plurality of wheels for moving the vehicle;
an application system supported by the chassis and including at least one storage container storing a volume of product for delivery onto an agricultural field;
a hydrostatic drivetrain system for delivering power to the wheels and including:
an internal combustion engine supported by the chassis,
a hydrostatic pump system receiving torque from the internal combustion engine and converting the torque from the internal combustion engine into hydraulic power for use by the hydrostatic drivetrain system, the hydrostatic pump system comprising first and second pumps arranged as a tandem pair of variable displacement hydrostatic pumps, and
hydraulic motors receiving hydraulic power from the hydrostatic pump system and arranged for delivering power for rotating the wheels, each hydraulic motor being configured to receive hydraulic fluid from the hydrostatic pump system for driving rotation of a wheel and return hydraulic fluid to the hydrostatic pump system;
operator controls provided in the cab, the operator controls including a touch screen Human Machine Interface (HMI); and
a processor executing a program stored in a non-transient medium, the processor executing the program to:
receive an input from a user operable to automatically calibrate the hydrostatic drivetrain system so that a magnitude of a first electrical signal for controlling a minimum or a maximum amount of hydraulic power from the first pump that is usable by the hydrostatic drivetrain system and a magnitude of a second electrical signal for controlling a minimum or a maximum amount of hydraulic power from the second pump that is usable by the hydrostatic drivetrain system are each determined.

15. The vehicle of claim 14, wherein the first pump is arranged forward of the vehicle and the second pump is arranged rearward of the vehicle.

16. The vehicle of claim 15, wherein the magnitude of the first electrical signal is a first magnitude for controlling a minimum amount of hydraulic power from the first pump, and further comprising the processor executing to determine a second magnitude of the first electrical signal for controlling a maximum amount of hydraulic power from the first pump, and wherein the magnitude of the second electrical signal is a first magnitude for controlling a minimum amount of hydraulic power from the second pump, and further comprising the processor executing to determine a second magnitude of the second electrical signal for controlling a maximum amount of hydraulic power from the second pump.

17. The vehicle of claim 14, further comprising the processor executing to calibrate the hydrostatic drivetrain system so that a magnitude of a wheel signal for controlling a minimum or a maximum amount of power delivered to a wheel that is usable by the wheel is determined.

18. The vehicle of claim 17, wherein the magnitude of the wheel signal is a magnitude of a first wheel signal for controlling a maximum amount of power delivered to a first wheel of the plurality of wheels, and further comprising the processor executing to determine a magnitude of a second wheel signal for controlling a maximum amount of power delivered to a second wheel of the plurality of wheels, a magnitude of a third wheel signal for controlling a maximum amount of power delivered to a third wheel of the plurality of wheels and a magnitude of a fourth wheel signal for controlling a maximum amount of power delivered to a fourth wheel of the plurality of wheels.

19. The vehicle of claim 14, further comprising a temperature sensor configured to sense a temperature of the hydraulic fluid, and further comprising the processor executing to calibrate the hydrostatic drivetrain system only when the temperature is above a predetermined minimum value.

20. The vehicle of claim 19, wherein the predetermined minimum value is at least 100 degrees Fahrenheit.

* * * * *